United States Patent
Watanabe et al.

(10) Patent No.: US 7,863,554 B2
(45) Date of Patent: Jan. 4, 2011

(54) FAR ULTRAVIOLET WITH HIGH LUMINANCE EMITTING HIGH-PURITY HEXAGONAL BORON NITRIDE MONOCRYSTALLINE POWDER AND METHOD OF MANUFACTURING THE SAME

(75) Inventors: Kenji Watanabe, Tsukuba (JP); Takashi Taniguchi, Tsukuba (JP); Hisao Kanda, Tsukuba (JP)

(73) Assignee: National Institute for Materials Science, Tsukuba-Shi, Ibaraki (JP)

( * ) Notice: Subject to any disclaimer, the term of this patent is extended or adjusted under 35 U.S.C. 154(b) by 104 days.

(21) Appl. No.: 11/988,033

(22) PCT Filed: Jul. 3, 2006

(86) PCT No.: PCT/JP2006/313632

§ 371 (c)(1),
(2), (4) Date: Dec. 28, 2007

(87) PCT Pub. No.: WO2007/004730

PCT Pub. Date: Jan. 11, 2007

(65) Prior Publication Data

US 2009/0078851 A1    Mar. 26, 2009

(30) Foreign Application Priority Data

Jul. 1, 2005    (JP) .............................. 2005-193358

(51) Int. Cl.
*H01L 31/00* (2006.01)

(52) U.S. Cl. ................................. 250/214.1; 250/208.2

(58) Field of Classification Search .............. 250/208.1, 250/214.1, 214 R, 208.2; 423/290
See application file for complete search history.

(56) References Cited

U.S. PATENT DOCUMENTS 6,541,111 B2 *   4/2003   Fauzi et al. .................. 428/366
(Continued)

FOREIGN PATENT DOCUMENTS

JP    H11-060394    3/1999
(Continued)

OTHER PUBLICATIONS

Takashi Taniguchi et al., High Pressure Synthesis of UV-Light Emitting Cubic Boron Nitride Single Crystals, Diamond and Related materials, 2003, vol. 12, pp. 1098-1102 2. Experiments.
(Continued)

*Primary Examiner*—Thanh X Luu
*Assistant Examiner*—Francis M Legasse, Jr.
(74) *Attorney, Agent, or Firm*—Manabu Kanesaka (57) ABSTRACT

While high-purity hexagonal boron nitride monocrystal (hBN) obtained by way of a high temperature/high-pressure treatment in the presence of a high-purity solvent has excellent properties in terms of far-UV luminescence characteristics, it has drawbacks including that it can be easily adversely affected by mechanical vibrations and impetus, that monocrystal shows a poor morphological retentiveness and that the luminescence characteristics fluctuate to shift the selected and set wavelength. The present invention can overcome the drawbacks of being easily affected by vibrations and showing a poor morphological retentiveness by grinding down the monocrystal obtained by a solvent/refining process into powder and applying the powder to a light emitting surface. Thus, the present invention provides crystal powder to be used for a far-UV luminescence device showing excellent luminescence characteristics that are stable and do not fluctuate.

13 Claims, 6 Drawing Sheets

U.S. PATENT DOCUMENTS

2004/0076572 A1* 4/2004 Clere et al. .................. 423/290
2006/0185577 A1* 8/2006 Watanabe et al. .............. 117/2

FOREIGN PATENT DOCUMENTS

JP        2004-035301       2/2004
JP        2005-075656       3/2005
WO    WO 2005/049898 A1    6/2005

OTHER PUBLICATIONS

K. P. Ananthanarayanan et al., Nuclear Instruments and methods, Jun. 1, 1974, vol. 118, No. 1, pp. 45-48 2. Experiment.

* cited by examiner

Fig. 3 sp2 bonds

● Nitrogen atom
○ Boron atom

FAR ULTRAVIOLET WITH HIGH LUMINANCE EMITTING HIGH-PURITY HEXAGONAL BORON NITRIDE MONOCRYSTALLINE POWDER AND METHOD OF MANUFACTURING THE SAME

TECHNICAL FIELD

This invention relates to (i) high-purity hexagonal boron nitride monocrystalline powder that emits far ultraviolet (far-UV) light showing an emission peak at wavelength between 224 nm and 233 nm, remarkably at 227 nm, with high luminance. The present invention also relates to (ii) a light emitting device having a fluorescent surface produced by applying such high-purity hexagonal boron nitride monocrystalline powder. Furthermore, the present invention relates to (iii) a radiation detection device for detecting electron beams and neutron beans realized by using such high-purity hexagonal boron nitride crystal powder.

BACKGROUND ART

Various light emitting materials including gallium nitride and solid solution thereof that show an emission wavelength of about 300 nm have been proposed in recent years in the course of development of high luminance UV light emitting materials for practical applications. There is a large demand for solid state light emitting materials showing a short emission wavelength including those that can be used for writing data highly densely on recording mediums and those that can be used to take the place of mercury-arc lamps containing mercury that is harmful to human bodies.

The requirements that need to be met by materials to be used for high luminance light emitting devices in the far-UV region (which is defined as wavelength range between 200 and 240 nm herein) include that such materials show a wide band gap and that they are chemically stable and desirably semiconductors of the direct transition type. The group of researchers including the inventors of the present invention has paid intensive efforts of developing materials that emit far-UV light to find as a result that highly purified crystalline boron nitride can be obtained by treating boron nitride in a solvent under high-pressure and the obtained high-purity hexagonal boron nitride monocrystal (the monocrystal is referred to as hBN hereinafter) has a band gap at or near 5.8 eV and a strong emission peak in a far-UV region at or near the wavelength of 200 nm. A patent application has been filed for the above research achievement, which is also published in a research paper (see Patent Documents 1 through 3 and Non-Patent Document 1).

However, the bond of nitrogen atoms and boron atoms is based on sp2 bonds in the obtained hBN and the hBN has a disadvantage that the designed profile of the hBN can be easily broken when an impetus is given mechanically and/or physically and is accompanied by a problem that the emission wavelength region varies before and after the breakage. Such problems are far from desirable as a matter of course when designing a light emitting device that is stable and shows a high emission efficiency. In other words, a far-UV luminescence material that can be handled with ease and morphologically stable is desired. Such morphological instability is experienced also in material design utilizing the proper high temperature stability of boron nitride. In short, it is desirable to put a target material in a state that is not subjected to morphological variations and convenient for use.

Sp3-bonded boron nitride described in Patent Document 4 is a desirable material from the above-described point of view. However, the described method of manufacturing the material is accompanied by drawbacks including that it is complex from the viewpoint of reproducibility and indispensably requires the use of an ultraviolet laser or a pulse laser, which is highly costly. Additionally, it is very difficult to manufacture boron nitride that is homogeneous in terms of light luminescence characteristics by means of the described method, which is a vapor phase growth method.

REFERENCE DOCUMENTS

Non-Patent Document 1: Nature Materials, vol. 3, 404-409 (2004)
Patent Document 1: JP-A-2003-388467
Patent Document 2: JP-A-2004-035501
Patent Document 3: JP-A-2004-260480
Patent Document 4: JP-A-2002-192863

DISCLOSURE OF THE INVENTION

Problems to be Solved by the Invention

The status quo of boron nitride materials that are expected to show excellent luminescence characteristics in the far-UV region is described above. Particularly, boron nitride monocrystal hBN showing a high light emission efficiency in the ultraviolet region that is developed and proposed by the group of researchers including the inventors of the present invention is of the direct transition type as described in the Patent Document 1 through 3 and hence a solid state light emitting device realized by using such a material is highly functional and can emit light in the far UV/short wavelength range with high luminance. Therefore, the material can be very advantageously utilized when the drawbacks that are pointed out above are overcome and eliminated. In other words, it is highly expected to provide means for overcoming and eliminating the drawbacks.

The present invention can answer the expectation. In other words, a problem to be solved by the present invention is to provide a method of growing high-purity monocrystal, or hBN, that can be obtained by a conventional hBN synthesis method with conveniences of finding various applications and also a method of subsequently morphologically processing the obtained crystal in order to produce a device that can emit far-UV light with high luminance, reflecting the characteristics of hBN. Another problem to be solved by the present invention is to provide a compact, low cost, high efficiency and high luminance solid state far-UV luminescence device without relaying on a large system using gas or a complex costly semiconductor manufacturing system. Still another problem to be solved by the present invention is to provide a high efficiency radiation sensor for detecting electron beams and neutron radiation that exploits the above-described luminescence characteristics.

Means for Solving the Problems

The inventors of the present invention have paid intensive research efforts, conducting synthesis experiments for obtaining high-purity hBN monocrystal by means of a clean and dry nitrogen atmosphere and a refined solvent, using an hBN material reported and proposed in the above cited Non-Patent Document 1 and the Patent Documents 1 through 3, in order to dissolve the problem of the morphological instability of the obtained high-purity hBN monocrystal by adjustment of temperature and pressure conditions. As a result, the inventors of the present invention came to find that it is effective to subject the monocrystal obtained by the above-described synthesis to a pulverization process in order to obtain crystal that does not show morphological fluctuations.

More specifically, the problems, or the drawbacks of monocrystal including that monocrystal shows a poor morphological retentiveness and that the luminescence characteristics thereof fluctuate are dissolved when the monocrystal obtained by synthesis is ground down to powder. Then, the obtained powder is stable relative to mechanical vibrations and impacts and shows an emission peak in a wavelength range between 224 nm and 233 nm, remarkably at 227 nm, so that it is possible to obtain high-purity hexagonal boron nitride monocrystalline powder that emits far-UV light without fluctuations. The inventors of the present invention also found that oxygen impurities take an important role in obstructing high luminance emission of light by such high-purity hBN monocrystal and that the monocrystal that is obtained by the above described synthesis and emits far-UV light with high luminance shows an oxygen impurity atom concentration of not greater than $10^{18}$ atoms per 1 cubic centimeter.

No oxygen impurities intrudes into the process of pulverizing monocrystal so as to be trapped in the crystal lattice and obstruct the emission of far-UV light and hence it is possible to reliably obtain uniform and high-purity hexagonal boron nitride powder by selecting high-purity crystal that contains oxygen impurities only to a low concentration level as starting material.

More specifically, as a result of intensively looking into high-purity hBN monocrystal of the prior art described in the Non-Patent Document 1 and the Patent Documents 1 through 3 as cited above, the inventors of the present invention succeeded in synthesizing high-purity hBN monocrystalline powder that shows a self emission peak in a far-UV wavelength range between 224 nm and 233 nm, remarkably at 227 nm simply by grinding down high-purity hBN obtained by the synthesis method described in the above cited documents to a powder level where the hBN is held in the form of crystal that does not morphologically fluctuate and irradiating it with electron beams. Furthermore, the inventors of the present invention succeeded in preparing an ultraviolet emitting material that shows stable and uniform luminescence characteristics without relying on a complex and costly manufacturing process as described in the Patent Document 4.

Additionally, the inventors of the present invention succeeded in designing and providing a simple, compact and high efficiency solid state far-UV luminescence device, which is different from conventional ultraviolet lamps using mercury and other harmful substances and conventional costly semiconductor solid state light emitting devices manufactured by repeating a pn junction process and a pin junction process for a number of layers, by applying high-purity hexagonal boron nitride crystalline powder to a substrate, utilizing it as a light emitting device or a light emitting layer and providing and incorporating excitation means for irradiating electron beams onto the light emitting layer. Still additionally, the inventors of the present invention succeeded in providing radiation detector that shows a high sensitivity and high responsiveness by forming a structure for leading UV light emitted from a light emitting substrate that is excited by radiation of electron beams or neutron radiations into a photodetector such as a photomultiplier tube.

The present invention is based on the above-described series of findings and successes achieved by research efforts and defined by in (1) through (13) below.

The invention relating to high-purity hexagonal boron nitride monocrystal and a method of synthesizing such monocrystal and monocrystalline powder obtained by powdering such monocrystal as defined in (1) through (5) is referred to as the invention of the first group hereinafter. The invention relating to a far-UV solid state light emitting device that utilizes such monocrystalline powder for a light emitting layer and a solid state light emitting unit realized by combining such a device and excitation means as defined in (6) through (10) is referred to as the invention of the second group hereinafter. Finally, the invention relating to a radiation detector for detecting electron beams and neutron radiations realized by combining a light emitting layer made of a substrate to which such monocrystalline powder is applied and a photodetector such as a photomultiplier tube as defined in (11) through (14) is referred to as the invention of the third group hereinafter.

(Invention of 1st Group)

(1) Far-UV luminescence high-purity hexagonal boron nitride monocrystalline powder having a structure with a disturbed order of the stacking direction of the stacked layers of the hexagonal networks formed by sp2 bonds produced by grinding down high-purity boron nitride monocrystal formed by sp2 bonds of nitrogen atoms and boron atoms and expressed by general formula BN and having a characteristic property of emitting far-UV light showing an emission peak at wavelength between 224 nm and 233 nm, remarkably at 227 nm, with high luminance when excited by excitation means.

(2) The far-UV luminescence high-purity hexagonal boron nitride monocrystalline powder as defined in (1) above, characterized in that the concentration of oxygen impurities of the far-UV luminescence high-purity hexagonal boron nitride monocrystalline powder is set to be not greater than $10^{18}$ atoms per 1 cubic centimeter.

(3) A method of manufacturing far-UV luminescence high-purity hexagonal boron nitride monocrystalline powder, characterized in that high-purity boron nitride monocrystal formed by sp2 bonds of nitrogen atoms and boron atoms and expressed by general formula. BN is ground down to obtain high-purity hexagonal boron nitride monocrystalline powder disturbing order of the stacking direction of the stacked layers of the hexagonal networks formed by sp2 bonds and having a characteristic property of emitting far-UV light showing an emission peak at wavelength between 224 nm and 233 nm, remarkably at 227 nm, with high luminance when excited by excitation means.

(4) The method of manufacturing far-UV luminescence high-purity hexagonal boron nitride monocrystalline powder as defined in (3) above, characterized in that the high-purity boron nitride monocrystal formed by sp2 bonds of nitrogen atoms and boron atoms and expressed by general formula BN is highly finely refined high-purity crystal obtained by re-crystallization of being treated at high temperature under high pressure in the presence of a high-purity solvent.

(5) The method of manufacturing far-UV luminescence high-purity hexagonal boron nitride monocrystalline powder as defined in (4) above, characterized in that one or more than one compounds selected from nitrides of alkali metals, alkaline earth metals and boron nitrides are used as the solvent.

(Invention of 2nd Group)

(6) A solid state light emitting device having a light emitting layer adapted to emit light when excited by excitation means, characterized by using as light emitting material for forming the light emitting layer far-UV luminescence high-purity hexagonal boron nitride monocrystalline powder having a structure with a disturbed order of the stacking direction of the stacked layers of the hexagonal networks formed by sp2 bonds produced by grinding down high-purity boron nitride monocrystal and having a property of emitting far-UV light showing an emission peak at wavelength between 224 nm and 233 nm, remarkably at 227 nm, when excited by excitation means.

(7) A solid state light emitting unit comprising a solid state light emitting unit having a light emitting layer and excitation means for exciting the light emitting layer, characterized in that the light emitting layer formed by using a light emitting material containing high-purity hexagonal boron nitride crystalline powder having a structure with a disturbed order of the stacking direction of the stacked layers of the hexagonal networks formed by sp2 bonds produced by grinding down high-purity boron nitride monocrystal and having a property of emitting far-UV light showing an emission peak at wavelength between 224 nm and 233 nm, remarkably at 227 nm, of the far-UV region and the excitation means are integrally sealed in a vacuum vessel so that the light emitting layer is efficiently excited by the excitation means to generate light.

(8) The solid state light emitting unit as defined in (7) above, characterized in that the excitation means is excitation means for emitting electron beams.

(9) The solid state light emitting unit as defined in (8) above, characterized in that the excitation means for emitting electron beams includes an anode fitted to the surface of the light emitting layer formed by applying a light emitting material, an electron beam emitting substrate fitted to the light emitting layer by way of an insulating spacer, a cathode fitted to the rear surface of the electron beam emitting substrate and means for applying a voltage between the electrodes and is adapted to emit electron beans from the electron beam emitting substrate to the light emitting layer and excite the light emitting layer so as to make it emit light when a voltage is applied between the electrodes.

(10) The solid state light emitting unit as defined in (9) above, characterized in that the electron beam emitting substrate fitted to the light emitting layer by way of the insulating spacer is a diamond substrate (Invention of 3rd Group)

(11) A light sensitive type radiation detector, characterized in that the detector comprises a light emitting layer made of high-purity hexagonal boron nitride crystalline powder having a structure with a disturbed order of the stacking direction of the stacked layers of the hexagonal networks formed by sp2 bonds produced by grinding down high-purity boron nitride monocrystal and having a property of emitting far-UV light showing an emission peak at wavelength between 224 nm and 233 nm, remarkably at 227 nm, of the far-UV region and a photodetector for detecting light from the light emitting layer and that, as radiation incidents the light emitting layer, the light emitting layer is excited to emit light by the radiation and the photodetector detects the emitted light.

(12) The radiation detector as defined in (11) above, characterized in that the light emitting layer is formed by applying a light emitting material made of high-purity hexagonal boron nitride crystalline powder having a property of emitting far-UV light showing an emission peak at wavelength between 224 nm and 233 nm, remarkably at 227 nm, of the far-UV region to a substrate.

(13) The radiation detector as defined in (11) or (12) above, characterized in that a boron component in high-purity hexagonal boron nitride crystalline powder of far-UV light showing an emission peak at wavelength between 224 mm and 233 nm, remarkably at 227 nm, of the far-UV region to be used for the light emitting layer is prepared in such a way that the concentration of isotopes having a mass number of 10 and a large thermal neutron absorption cross-sectional area is greater than the natural abundance ratio of 20% to make the detector easily sense to neutron radiations.

(14) The radiation detector as defined in (13), characterized in that it is adapted to detect neutron radiations.

Note that "showing an emission peak at wavelength between 224 nm and 233 nm, remarkably at 227 nm (having an emission peak at 227 nm of the far-UV region)" means that "showing an emission peak at wavelength between 224 nm and 233 nm (having an emission peak at 233 nm of the far-UV region) and the emission peak is remarkably strong at 227 nm".

Advantages of the Invention

The invention of the first group makes it possible to produce in a simple and less costly way hexagonal boron nitride monocrystalline powder having a property of being stable relative to mechanical vibrations and impacts and that of emitting light with high luminance at wavelength between 224 nm and 233 nm, remarkably at 227 nm, the conventional art cannot provide. Then, as a result, it is now possible to design high luminance UV light solid state light emitting devices and develop higher density recording mediums. Therefore, it is now possible to meet various demands including a demand for high power UV light emitting devices and a demand for UV light emitting devices showing a strong sterilization effect.

The invention of the second group makes it possible to provide compact, low cost, high efficiency and highly durable high luminance solid state light emitting units showing a single emission peak at a wavelength between 224 nm and 233 mm, remarkable at 227 nm, at room temperature by using high-purity boron nitride crystalline powder for a light emitting layer and integrally incorporating such a light emitting layer and excitation means, particularly electron beam excitation means formed by using a substrate having an electron beam emitting section of diamond, into a vacuum vessel.

The invention of the third group makes it possible to provide compact, low cost and highly durable radiation detectors for detecting electron beams and neutron radiations by utilizing high-purity boron nitride crystalline powder for a light emitting layer.

As described above, the inventors of the present invention succeeds in providing a compact solid state light emitting device, a compact solid state light emitting unit and a highly sensitive high-speed radiation detector that have an emission wavelength at a wavelength between 224 nm and 233 nm, remarkable at 227 nm. The conventional art has not hitherto been able to provide them and hence the present invention can contribute to the development of various industrial fields. As a matter of fact, there is a strong demand for compact, high output power, low cost and highly durable solid state far-UV luminescence devices and solid state light emitting units in many fields and the scope of application thereof extends to the fields of semiconductors (high definition photolithography), information processing (next generation large capacity disks), medical care, bio technologies (opthalmologic treatments, DNA cutting) and environment (sterilization) and the benefits that the present invention can provide is immeasurable. Highly sensitive high-speed radiation detectors are very important in the fields of utilization of atomic power and medical care.

EXPLANATION OF REFERENCE SYMBOLS

1: conductive metal plate (platinum plate)
2: carbon nanotube
3: insulating glass plate
4: gold electrode (extraction electrode)
5: hBN monocrystalline powder
6: substrate (quartz substrate)
7: Ti/Au deposition electrode (anode)
8: substrate with hBN monocrystalline powder applied to the surface
9: stray light removing filter
10: photomultiplier tube
11: signal detection and photomultiplier tube drive circuit Best Mode for Carrying Out the Invention Now, the present invention will be described in greater detail in terms of the best mode for carrying out the present invention sequentially from the invention of the first group down to the invention of the third group. Specific examples are described below simply for the purpose of easy understanding of the present invention and the best mode of carrying out the invention and by no means limit the scope of the present invention.

The invention of the first group relates to a process of manufacturing high-purity hBN monocrystalline powder that emits UV light in the far-UV region and also to a light emitting device formed by using such monocrystalline powder.

High-purity hBN monocrystalline powder that emits UV light in the far-UV region is produced by way of a process of treating the material hBN at high temperature under high-pressure in the presence of a solvent of high-purity boron nitride of alkali metal or alkaline earth metal and subsequently re-crystallizing it and a process of grinding the obtained re-crystallized product down to powder for pulverization.

Now, the process of obtaining high-purity hBN monocrystal will be described first below.

It is possible to obtain high-purity hBN monocrystal that does not contain any impurities and emit UV light with high luminance in a frequency range not higher than 235 nm, particularly between 210 nm and 220 nm and remarkably at 215 nm, without any noticeable defect by re-crystallization.

High temperature and high-pressure are required for the above process. As rule of thumb, it is preferable to use a pressure of 20,000 atm. and a temperature of not lower than 1,500° C.

The above requirements are temperature and pressure requirements for re-crystallizing the material, which is boron nitride, into hBN in the presence of a solvent. It is necessary that the boron nitride of alkali metal or alkaline earth metal that is employed as solvent is stably in place without being oxidized or decomposed during the process. Particularly, it is effective to make the reaction proceed under high-pressure because the solvent is prevented from being decomposed under such high-pressure. Then, it is possible to realize a long-lasting process of crystallization and growth for the purpose of synthesizing high-purity crystal on a large scale.

Figure 1:
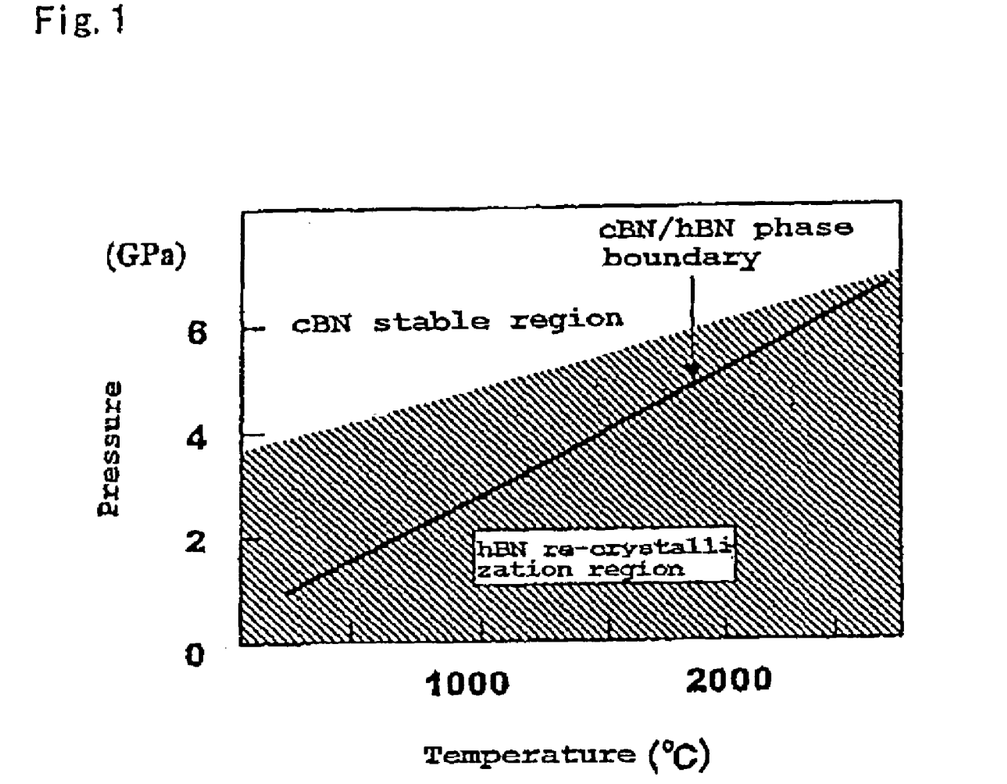
FIG. 1 is a condition graph schematically illustrating the region for synthesizing re-crystallized hBN.

However, care should be taken so as not to raise the pressure to an excessively high-pressure level because the hBN that is used as starting material shows a phase transition to a high-pressure phase and becomes cBN. In other words, the temperature and pressure conditions need to be held in a region that does not produce any cBN in order to obtain target high-purity hBN monocrystal. FIG. 1 is a graph schematically illustrating the temperature and pressure conditions for re-crystallizing hBN. According to the graph, while it is possible to re-crystallize hBN under thermodynamically stable conditions of cBN, the phase transition to cBN proceeds with ease as the pressure rises. Therefore, a high reaction temperature that satisfies the requirements of stabilizing hBN is necessary to make the process of hBN re-crystallization proceed.

More specifically, it is appropriate to set the upper limit pressure for re-crystallizing hBN to about 6 GPa. The synthesis conditions need to be redefined for the thermodynamically stable conditions of hBN when the pressure is higher than the above cited level. Then, the temperature will be about 3,000° C., which is not appropriate for obtaining sufficiently large crystal. Therefore, 60,000 atm. is acceptable as upper limit pressure for synthesizing monocrystal. As for the lower limit pressure, it is possible to synthesize high-purity hBN crystal that emits far-UV light with high luminance with a pressure level that is not higher than 1 atm. so long as decomposition or oxidation of the solvent can be suppressed. In an experiment conducted for the purpose of the present invention, high-purity hBN crystal that emits far-UV light with high luminance was synthesized in the hBN re-crystallization region that is shaded in FIG. 1.

On the other hand, boronnitrides of alkali metals and alkaline earth metals readily react with moisture and oxygen and hence hBN that was re-crystallized in a reaction system containing oxygen and other impurities was affected by the impurities including oxygen so that it was not possible to obtain hBN monocrystal that gives rise to a phenomenon of emitting light in a short wavelength region not greater than 300 nm. To the contrary, according to the present invention, it is possible to obtain high-purity hBN monocrystal that emits UV light with high luminance in a short wavelength region not greater than 235 nm, particularly between 210 nm and 220 nm, remarkably at 215 nm by using boron nitride of a so-called low pressure phase that is popularly commercially available as material, dissolving it in a high-purity solvent and re-crystallizing it.

Figure 2:
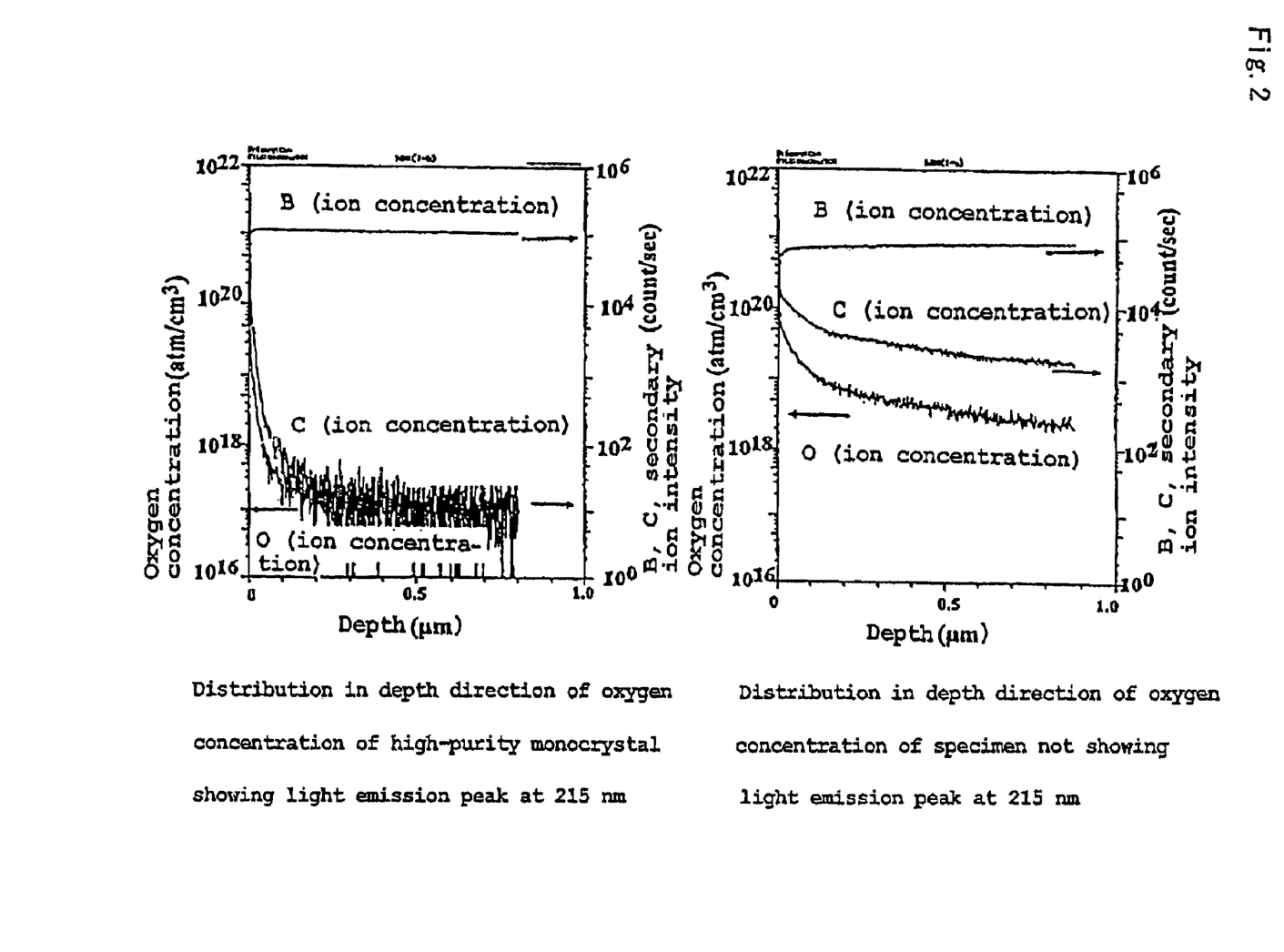
FIG. 2 is graphs illustrating some of the results obtained by the use of secondary ion mass spectrometry for determining the oxygen atom concentration.

Additionally, as seen from the secondary ion mass spectrometry (SIMS) illustrated in FIG. 2, high-purity hBN monocrystal that emits light at 215 nm and monocrystal containing oxygen and other impurities clearly differ from each other in terms of oxygen concentration. It shows that the atomic concentration of high-purity monocrystal that emits far-UV light of 215 nm is not greater than $10^{18}$ atoms per 1 cubic centimeter.

Now, the process of pulverizing high-purity hBN monocrystal and the advantages thereof will be described below.

Figure 3:
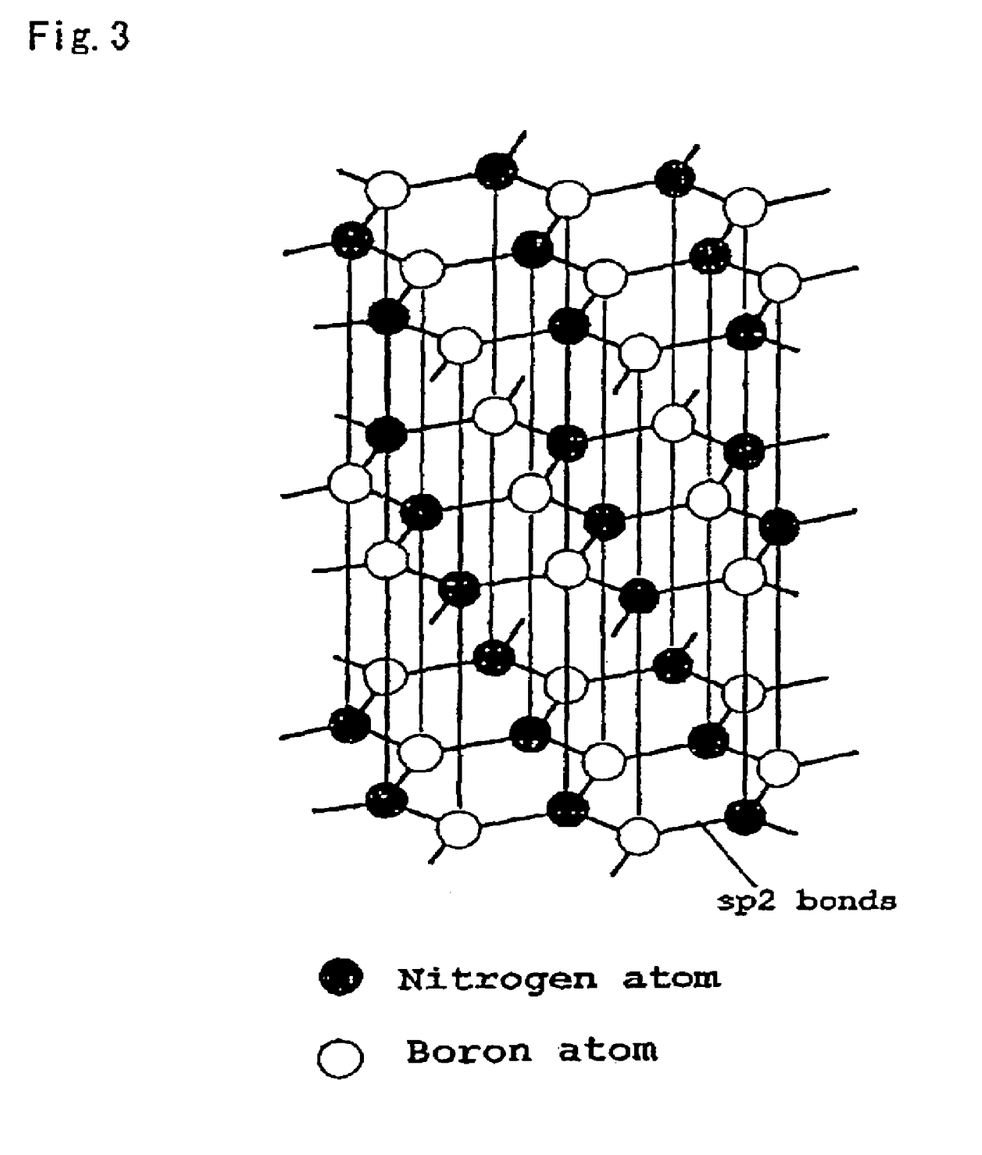
FIG. 3 is a schematic conceptual illustration of the crystal structure of hBN monocrystal.

FIG. 3 is a schematic conceptual illustration of the crystal structure of hBN monocrystal shown for the purpose of reference.

As shown in FIG. 3, hBN is formed as boron atoms and nitrogen atoms form strong and stable hexagonal networks due to sp2 bonds and the hexagonal networks are bonded only weakly and laid one on the other. Therefore, the monocrystal obtained by way of the above-described process shows a strong cleaving property in directions parallel to the c-plane, or the hexagonal networks, so that it can be collapsed easily by physical reasons such as mechanical vibrations.

Additionally, the dimensions of hBN that can be produced currently are limited to several millimeters and hence its applications are quite limited. According to the present invention, such monocrystal is ground down to produce powder that is more stable and convenient for use. Emission energy is obtained from hBN monocrystal at wavelength of 215 nm due to free excitons, which reflects the properties specific to the substance. Powder obtained by pinching such monocrystal between metal plates and applying power to the metal plates to grind down the monocrystal emits UV light uniformly showing an emission peak at a wavelength range between 224 nm and 233 nm, remarkably at 227 nm.

The reason for this is that, as the monocrystal is ground down, free excitons found in the high purity monocrystal are trapped in the stacking faults of hBN due to the disturbance of the layers of hexagonal networks that are arranged in order and the bound excitons cause emission of light. However, the hexagonal networks formed by sp2 bonds are firm and strong relative to such physical deformation and would not change the form of bond to some other form such as sp3 bonds. In other words, such physical deformation only disturbs the order of the network stacking direction of the crystal. Therefore, once stacking faults are intentionally produced, the above described emission wavelength becomes stable and the emission peak would not be shifted remarkably if the monocrystal is further physically deformed. Furthermore, it is not possible for impurity atoms to enter the monocrystal and become taken into the crystal lattice so as to obstruct emission of light when such physical deformation takes place. Thus, emission of far-UV light would not be obstructed by such physical deformation.

In other words, the emission peak of powder is identified as that of emitted light that can be observed only when the order of the network stacking direction is disturbed and specific to hBN having sp2 bonds. As may be easily imaginable from the above described phenomena, while hBN monocrystal shows instability in terms of peak energy position of the emission spectrum attributable to the shape instability relative to physical deformation caused by physical/mechanical vibrations and impacts and hence gives rise to problems in actual applications, the peak energy position of the emission spectrum becomes stable relative to any further physical deformation once it is pulverized so that pulverized hBN can find various applications.

Now, the invention of the first group will be described in greater detail by way of examples, referring to the related drawings. It should be noted, however, that the examples are described below only to help understanding of the present invention and the present invention is by no means limited by the examples. In other words, the present invention can be subjected to modifications and alterations without departing from the spirit and scope of the invention and such modifications and alterations are within the scope of the invention.

Examples 1 through 3 relates to the method of synthesizing and growing high-purity hBN monocrystal that is the starting material for producing high-purity hBN monocrystalline powder that emits far-UV light and Example 4 relates to the specific effects and advantages of a process of pulverizing monocrystal that can obtained as in the preceding examples.

EXAMPLE 1

Sinter of hexagonal boron nitride (particle size: about 0.5 μm) subjected to a deoxygenation process involving a heat treatment at 1,500° C. in vacuum and at 2,000° C. in a nitrogen gas flow was put into a molybdenum capsule in a high-pressure vessel with barium boron nitride solvent to fill the capsule. The operation of preparing the solvent and that of filling the capsule with the specimen were conducted in a dry nitrogen atmosphere. The high-pressure reaction vessel was treated at 1,700° C. under pressure of 25,000 atm. for 20 hours by means of a belt type high-pressure apparatus. The temperature was raised at a rate of about 50° C./min. After cooling the reaction vessel at a rate of about 500° C./min, the applied pressure was removed and the specimen was collected with the molybdenum capsule in the pressure vessel.

Subsequently, the molybdenum capsule was removed by means of a mechanical or chemical treatment (mixture solution of hydrochloric acid/nitric acid) to collect the specimen. As a result, colorless and transparent crystal of hexagonal prism (about 1 to 3 mm) was obtained. The crystal was identified by observing it through an optical microscope and a SEM and by X-ray diffraction and the optical characteristics of the crystal (transmittance, cathodeluminescence) were evaluated by means of an optical characteristic examination. The crystal was proved to be of an hBN single phase by way of an X-ray diffraction graph of crystal particles. Emission of UV light showing a single peak at or near the wavelength of 215 nm was observed with high luminance at room temperature as a result of a cathodeluminescence observation.

EXAMPLE 2

Sinter of hexagonal boron nitride (particle size: about 0.5 μm) subjected to a deoxygenation process involving a heat treatment at 1,500° C. in vacuum and at 2,000° C. in a nitrogen gas flow was put into a molybdenum capsule in a high-pressure vessel with a solvent prepared by mixing barium boron nitride and lithium boron nitride at a weight ratio of 1:1 to fill the molybdenum capsule. A high-pressure treatment was conducted as in Example 1 and the specimen was collected.

The collected specimen showed a form like the specimen of Example 1 and proved to be of hBN crystal. Emission of UV light at or near the wavelength of 215 nm was observed with high luminance together with broad emission at around 300 nm as a result of a cathodeluminescence observation.

EXAMPLE 3

Sinter of hexagonal boron nitride (particle size: about 0.5 μm) subjected to a deoxygenation process involving a heat treatment at 1,500° C. in vacuum and at 2,000° C. in a nitrogen gas flow was put into a molybdenum capsule with a solvent prepared by mixing barium boron nitride and lithium boron nitride at a weight ratio of 1:1 to fill the capsule. The operation of preparing the solvent and that of filling the capsule with the specimen were conducted in a dry nitrogen atmosphere. The molybdenum reaction vessel was treated at 1,500° C. in a nitrogen gas flow of 1 atm. for 2 hours. The temperature was raised at a rate of about 10° C./min. After cooling the reaction vessel at a rate of about 20° C./min, the molybdenum capsule was collected.

Subsequently, the molybdenum capsule was removed by means of a mechanical or chemical treatment (mixture solution of hydrochloric acid/nitric acid) to collect the specimen. While the solvent part was partly decomposed, re-crystallization was partly observed at interfaces of the material of hBN. The solvent component was removed by means of an acid treatment and, after washing, the obtained hBN crystal was identified by observing it through an optical microscope and an SEM and by X-ray diffraction and the optical characteristics of the crystal (transmittance, cathodeluminescence) were evaluated by means of an optical characteristic examination. Emission of UV light showing a single peak at or near the wavelength of 215 nm was observed with high luminance together with broad emission at around 300 nm as a result of a cathodeluminescence observation.

When monocrystals are obtained in a plurality of samples by changing the synthesis conditions in addition to Examples 1 through 3, it is found that the largest emission peaks are at wavelength between 210 nm and 220 nm, remarkably 215 nm. The emission peaks are distributed in small but somewhat wavelength range. Not exactly, but it is concerned that non-uniformity of crystallinity due to minute amounts of components such as defects or impurities are related to such a distribution.

EXAMPLE 4

Figure 4:
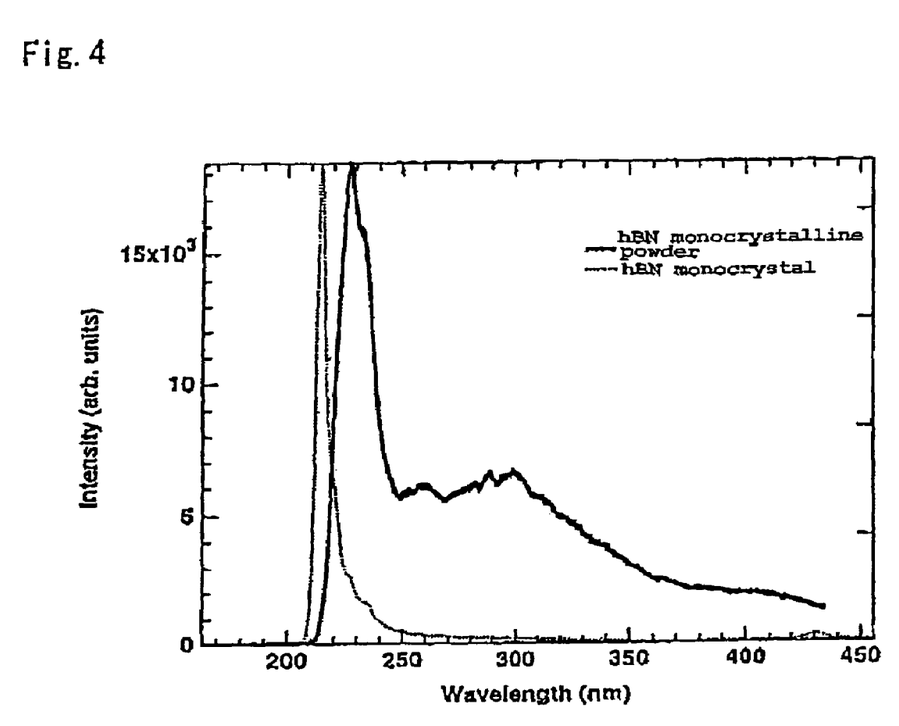
FIG. 4 is a graph illustrating an example of emission spectra obtained by electron beam excitation of two crystal forms (monocrystal and monocrystalline powder) at room temperature.

A process of pulverizing monocrystal obtained as in Examples 1 through 3 and the advantages thereof will be described below. In this example, hBN monocrystal was put between a pair of aluminum plates that are arranged in parallel with each other and crushed at room temperature. The manner and direction of applying crushing force do not make any particular difference. The particle size of the obtained monocrystalline powder can be controlled according to the application thereof by providing the surfaces of the aluminum plates that are held in contact with hBN monocrystal with appropriate undulations. The emission spectrum of the obtained monocrystalline powder is shown in FIG. 4 along with a typical emission spectrum obtained in one of Examples 1 through 3 for the purpose of comparison. FIG. 4 shows examples of cathodeluminescence spectrum. As seen from FIG. 4, the peak at 215 nm is shifted to 227 nm as the hBN monocrystal is crushed and the order of the network stacking direction is disturbed.

Now, the invention of the second group will be described in greater detail by way of an example, referring to the related drawing. It should be noted, however, that the example is described below only to help understanding of the present invention and the present invention is by no means limited by the examples.

The invention of the second group relates to a specific method of utilization of high-purity hexagonal boron nitride monocrystal obtained according to the invention of the first group and that shows specific far-UV luminescence characteristics. It provides an electron beam excitation type solid state light emitting device that generates far-UV light showing a single emission peak in a wavelength range between 224 nm and 233 nm, remarkably at 227 nm.

EXAMPLE 5

Figure 5:
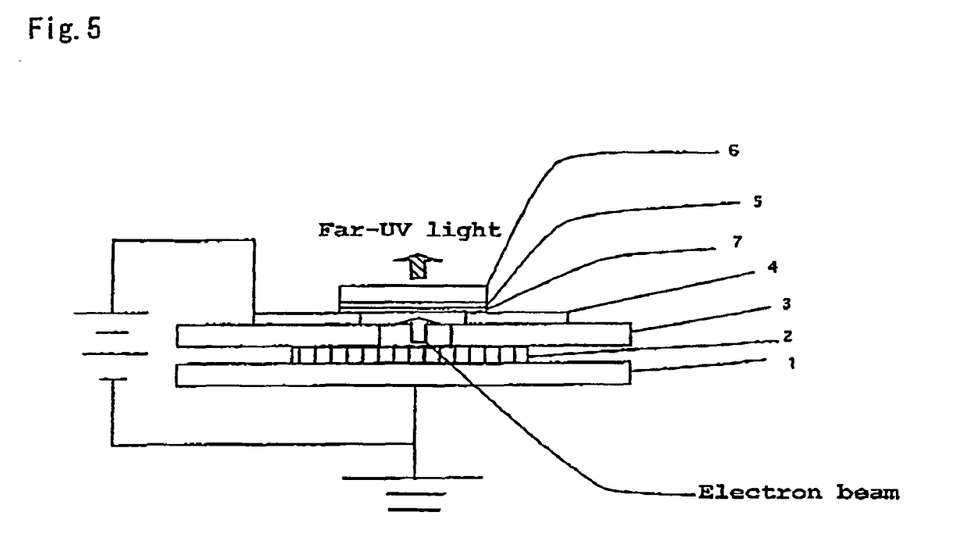
FIG. 5 is a schematic illustration of the structure of a solid state far-UV luminescence device according to the present invention.

An electron beam excitation type solid state light emitting unit formed by using the hBN monocrystalline powder obtained in Example 4 was prepared in this example. FIG. 5 is a schematic illustration of the structure of a far-UV solid state light emitting unit according to the present invention. The structure and the function of the device will be described by referring to FIG. 5.

A device in which a carbon nanotube 2 is rigidly secured onto a conductive metal plate such as a platinum plate 1 was used as electron-emitting device. The carbon nanotube 2 may be secured to the metal plate by means of a conductive adhesive agent or molten indium. An insulating glass plate 3 (about 100 μm thick) was brought in and a circular hole was cut through the glass plate 3 to a diameter of about 500 μm. Then, gold (Au) 4 was deposited to the surface of the edge of the hole and its neighboring area to a thickness of about 50 nm by evaporation as shown in FIG. 5.

Thereafter, the hBN monocrystalline powder 5 obtained in Example 4 that emits far-UV light showing a single emission peak at wavelength between 224 nm and 233 nm, remarkably at 227 nm, was applied to the a transparent substrate, or a quartz glass substrate 6. A solution prepared by dispersing the hBN monocrystalline powder in water or volatile organic solvent may be applied and dried or the surface of the transparent substrate may be heated to melt the surface layer and the hBN monocrystalline powder may be sprayed so as to be held to the surface. Ti/Au was deposited onto the surface, where the powder had been applied, to a thickness of about 15 nm by evaporation to produce an electrode 7 that operates as anode.

The substrate 6 was placed on the glass plate 3 to bring the electrode 7 and the gold-deposited surface 4 into contact with each other to form an electron emitting mechanism where the carbon nanotube 2 and the hBN monocrystalline powder 5 having the surface 7 coated with the thin film of deposited Ti/Au operate respectively as cathode and anode. The gold-deposited surface 4 of the glass plate 3 takes the role of drawing electrode for the anode. The UV emitting window of the UV light emitting device was put into a glass tube of quartz having a window and the glass tube was hermetically sealed. The electrode was taken out and the inside of the glass tube was vacuumed (to a high degree of vacuum of not more than $1 \times 10^{-5}$ Torr).

The above described platinum substrate side electrode was grounded and a voltage of about 1 kV was applied to the anode drawing electrode 4 to emit electrons from the carbon nanotube emission source and excite the hBN monocrystalline powder. The excited hexagonal boron nitride powder emitted far-UV light showing a single emission peak at wavelength between 224 nm and 233 nm, remarkably at 227 nm, with high luminance. Emitted UV light was taken out from the rear surface of quartz glass substrate 6 where the hexagonal boron nitride had been applied and made available through the UV emitting window.

As described above for this example, the inventors of the present invention succeeded in obtaining compact and high efficiency UV light emitting device and unit that are totally different from conventional far-UV luminescence devices. Known and currently available similar devices using monocrystal cannot have a large area because the size of monocrystal is limited. However, it now is possible to provide a large area by pulverizing monocrystal and applying it to a substrate as evidenced by the above-described example.

The above-described examples show only several modes of carrying out the invention and the present invention is by no means limited to the examples. For instance, while emission of light of the above-described examples is limited only to the far-UV region, it is possible to prepare a visible light emitting device by adding phosphor that emits visible light when excited by far-UV light with hBN monocrystalline powder. Similarly, while a carbon nanotube emitter was used as electron beam source in the above-described last example, a diamond emitter may alternatively be used. Furthermore, it is possible to produce electron beams and beams of far-UV light that are patterned by arranging carbon nanotube emitters in the form of a lattice and controlling the carbon nanotubes emitters disposed at the crossings of the lattice independently. Such an arrangement can find applications in the field of display devices.

Now, the invention of the third group will be described in greater detail by way of an example, referring to the related drawing. It should be noted, however, that the example is described below only to help understanding of the present invention and the present invention is by no means limited by the examples.

EXAMPLE 6

Figure 6:
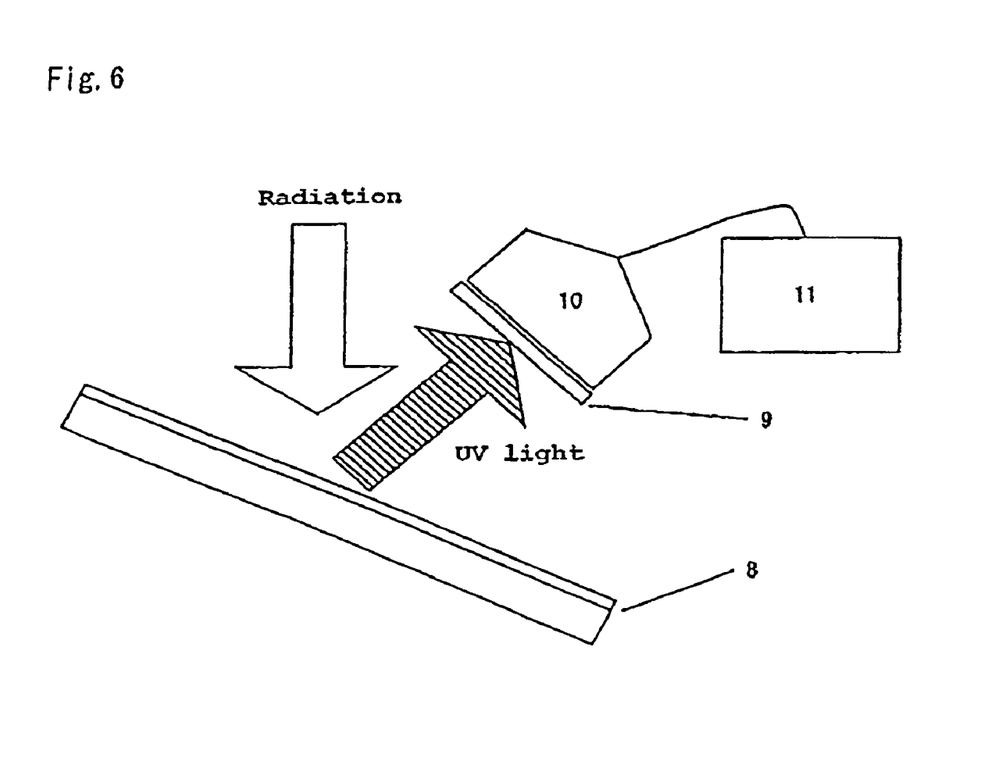
FIG. 6 is a schematic illustration of the structure of a radiation detector according to the present invention.

In this example, a radiation detector is prepared by using the hBN monocrystalline powder obtained in Example 4. FIG. 6 is a schematic conceptual illustration of the structure of a far UV generating solid state light emitting device according to the present invention. The structure and the function of a radiation detector according to the present invention will be described below by referring to the conceptual illustration of FIG. 6. The hBN monocrystalline powder obtained in Example 4 that emits far-UV light showing a single emission peak at wavelength between 224 nm and 233 nm, remarkably at 227 nm, was applied to the a transparent substrate, or a quartz glass substrate 8. A solution prepared by dispersing the hBN monocrystalline powder in water or volatile organic solvent may be applied and dried or the surface of the transparent substrate may be heated to melt the surface layer and the hBN monocrystalline powder may be sprayed so as to be held to the surface.

Then, a photomultiplier tube 10 that is provided with a filter 9 for eliminating light in the room and a signal detecting/photomultiplier tube drive circuit 11 are arranged near the surface where the powder had been applied. The photodetector using a photomultiplier tube may be replaced by a photodetector using a diamond semiconductor that shows a solar-blinding effect to make the use of the filter 9 unnecessary.

The place where the photodetector is arranged may be selected so as to make the photodetector operate efficiently and prevent noise signals. A structure using mirrors and lenses may be employed to converge far-UV light emitted from the hBN monocrystalline powder to the photodetector. As radiation such as electron beams or neutron radiations strikes the hBN monocrystalline powder, the latter highly efficiently emits far-UV light showing a single emission peak at wavelength between 224 nm and 233 nm, remarkably at 227 nm. Thus, the device operates as radiation detector by detecting the emitted far-UV light by means of the photodetector. The emitted light disappear in about several hundreds pico-seconds so that the response speed of the radiation detector is substantially determined by the response speed of the photodetector. In other words, a high-speed response of not longer than a hundred nano-seconds can be expected in ordinary cases.

As described above for this example, the inventors of the present invention succeeded in obtaining compact, high efficiency and high-speed radiation detector that is totally different from conventional far-UV luminescence devices. Known and currently available similar devices using monocrystal cannot have a large area because the size of monocrystal is limited. However, it now is possible to provide a large area by pulverizing monocrystal and applying it to a substrate as evidenced by the above-described example.

The above-described examples show only several modes of carrying out the invention and the present invention is by no means limited to the examples. For instance, the absorption cross sectional area of a thermal neutron beam of isotopes of mass number 10 is greater than isotopes with of mass number 11. Therefore, it is possible to prepare a high sensitivity neutron detector by intentionally raising the concentration of isotopes of mass number 10 to a level higher than the natural abundance ratio of 20%.

INDUSTRIAL APPLICABILITY

The present invention provides with ease hexagonal boron nitride monocrystalline powder that emits far-UV light showing an emission peak at wavelength between 224 nm and 233 nm, remarkably at 227 nm, with high luminance at low cost. The prior art cannot provide such a function. As a result, it is possible to design a high luminance solid state far-UV luminescence device. It is very significant that the present invention can provide a basic material for high density recording mediums, the demand for which has ever been increasing in recent years. Thus, the present invention can greatly contribute to industrial developments. Additionally, the demand for sterilization processes using ultraviolet rays has been increasing and attracting attention from the viewpoint of environment protection. Therefore, the present invention can greatly contribute to meeting the demand so as to further develop the industry and improve the living environment.

The invention claimed is:

1. Boron nitride monocrystalline powder for far-UV luminescence, comprising:
   boron nitride monocrystal having a hexagonal crystalline structure based on hexagonal networks formed by sp2 bonds of nitrogen atoms and boron atoms and expressed by general formula BN, and having a concentration of oxygen impurities controlled not greater than $10^{18}$ atoms per 1 cubic centimeter,
   wherein said boron nitride monocrystal is a powder and has stacking faults due to a disturbed order in a stacking direction of the hexagonal networks so that an emission wavelength when excited by excitation means is between 224 nm and 233 nm.

2. The boron nitride monocrystalline powder according to claim 1, wherein the emission wavelength is 227 nm.

3. A method of manufacturing boron nitride monocrystalline powder for far-UV luminescence, comprising:
   grinding boron nitride monocrystal into a powder, said boron nitride monocrystal having a hexagonal crystalline structure based on hexagonal networks formed by sp2 bonds of nitrogen atoms and boron atoms and expressed by general formula BN, and a concentration of oxygen impurities controlled not greater than $10^{18}$ atoms per 1 cubic centimeter, wherein said boron nitride monocrystal has an emission wavelength between 210 and 220 nm when excited by excitation means, and in the grinding step, stacking faults due to disturbing order in a stacking direction of stacked layers of the hexagonal networks are introduced into the boron nitride monocrystal so that the emission wavelength between 210 and 220 nm is shifted to the emission wavelength between 224 nm and 233 nm.

4. The method according to claim 3, wherein in the grinding step, the stacking faults due to the disturbing order in the stacking direction of the stacked layers of the hexagonal networks are introduced into the boron nitride monocrystal so that the emission wavelength between 210 and 220 nm is shifted to the emission wavelength of 227 nm.

5. A solid state light emitting device comprising:
a light emitting layer adapted to emit light when excited by excitation means, said light emitting layer having a boron nitride monocrystalline powder for far-UV luminescence, said boron nitride monocrystalline powder comprising boron nitride monocrystal having a hexagonal crystalline structure based on hexagonal networks formed by sp2 bonds of nitrogen atoms and boron atoms and expressed by general formula BN, and a concentration of oxygen impurities controlled not greater than $10^{18}$ atoms per 1 cubic centimeter,
wherein said boron nitride monocrystal is a powder, said powder having stacking faults due to a disturbed order in a stacking direction of the hexagonal networks so that an emission wavelength when excited by excitation means is between 224 nm and 233 nm.

6. A solid state light emitting device comprising:
a vacuum vessel,
a solid state light emitting device having a light emitting layer, and
excitation means for exciting the light emitting layer,
wherein the light emitting layer includes a boron nitride monocrystalline powder for far-UV luminescence, said boron nitride monocrystalline powder comprising boron nitride monocrystal having a hexagonal crystalline structure based on hexagonal networks formed by sp2 bonds of nitrogen atoms and boron atoms and expressed by general formula BN, and a concentration of oxygen impurities controlled not greater than $10^{18}$ atoms per 1 cubic centimeter,
wherein said boron nitride monocrystal is a powder having stacking faults due to a disturbed order in a stacking direction of the hexagonal networks so that an emission wavelength when excited by excitation means is between 224 nm and 233 nm, and
wherein the light emitting layer and the exciting means are located in the vacuum vessel kept in a vacuum state.

7. The solid state light emitting unit according to claim 6, wherein the excitation means emits electron beams.

8. The solid state light emitting unit according to claim 7, wherein the excitation means for emitting electron beams includes:
an anode fitted to the light emitting device,
an electron beam emitting substrate,
a cathode fitted to the electron beam emitting substrate,
an insulating spacer disposed between the anode and cathode, and
means for applying a voltage between the anode and cathode,
wherein the light emitting device and the exictation means are arranged such that the anode and cathode face each other, and
the means for applying the voltage applies the voltage and emits electron beams from the electron beam emitting substrate to the light emitting layer to excite the light emitting layer.

9. The solid state light emitting unit according to claim 8, wherein the electron beam emitting substrate is a diamond substrate.

10. A light sensitive radiation detector, comprising:
a light emitting layer, and
a photodetector for detecting light from the light emitting layer,
wherein the light emitting layer includes a boron nitride monocrystalline powder for far-UV luminescence, said boron nitride monocrystalline powder comprising boron nitride monocrystal having a hexagonal crystalline structure based on hexagonal networks formed by sp2 bonds of nitrogen atoms and boron atoms and expressed by general formula BN, and a concentration of oxygen impurities controlled not greater than $10^{18}$ atoms per 1 cubic centimeter, and
wherein said boron nitride monocrystal is a powder having stacking faults due to a disturbed order in a stacking direction of the hexagonal networks so that an emission wavelength when excited by excitation means is between 224 nm and 233 nm.

11. The radiation detector according to claim 10, wherein the light emitting layer further includes a transparent substrate, and the boron nitride monocrystalline powder is applied on the transparent substrate.

12. The radiation detector according to claim 10, wherein the light emitting layer includes concentration of isotopes having a mass number of 10 greater than a natural abundance ratio of 20%.

13. The radiation detector according to claim 12, wherein the detector detects neutron radiations.

* * * * *